(12) United States Patent
Choi et al.

(10) Patent No.: US 10,334,614 B1
(45) Date of Patent: Jun. 25, 2019

(54) METHOD AND SYSTEM FOR MITIGATING INTERFERENCE BETWEEN DIFFERENT RADIO ACCESS TECHNOLOGIES UTILIZED BY A COMMUNICATION DEVICE

(71) Applicant: MARVELL INTERNATIONAL LTD., Hamilton (BM)

(72) Inventors: Jihwan P. Choi, Daegu (KR); Hui-Ling Lou, Sunnyvale, CA (US); Leilei Song, Sunnyvale, CA (US); Yakun Sun, San Jose, CA (US); Qing Zhao, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 388 days.

(21) Appl. No.: 15/357,781

(22) Filed: Nov. 21, 2016

Related U.S. Application Data

(63) Continuation of application No. 14/136,860, filed on Dec. 20, 2013, now Pat. No. 9,503,245.

(60) Provisional application No. 61/740,294, filed on Dec. 20, 2012.

(51) Int. Cl.
*H04J 3/00* (2006.01)
*H04W 72/12* (2009.01)
*H04W 88/06* (2009.01)

(52) U.S. Cl.
CPC ........ *H04W 72/1215* (2013.01); *H04W 88/06* (2013.01)

(58) Field of Classification Search
CPC .. H04W 72/1215; H04W 16/14; H04W 88/06
See application file for complete search history.

(56) References Cited

U.S. PATENT DOCUMENTS

| 6,614,797 B1 | 9/2003 | Hippelainen |
| 7,215,659 B1 | 5/2007 | Chen et al. |
| 7,277,692 B1 | 10/2007 | Jones et al. |

(Continued)

OTHER PUBLICATIONS

"How 802.11b/g Wireless WLAN and Bluetooth Can Play; Without Standards-Based Solutions, ICs Must Referee Spectrum Rivalry," Philips Electronics, dated Sep. 2005, 5 pages.

(Continued)

*Primary Examiner* — Yemane Mesfin
*Assistant Examiner* — Abdelillah Elmejjarmi

(57) ABSTRACT

Various methods and apparatus are disclosed for mitigating interference between communications between different radio access technologies in a communication device. Methods and apparatus include communicating between a first communication device and a second communication device according to a first communication protocol, and communicating between the first communication device and a third communication device according to a second communication protocol. The methods and apparatus further include determining a first time interval associated with when data is to be transmitted between the first communication device and the second communication device according to the first communications protocol. The methods and apparatus also include sending to the third communication device, an indication of a second time interval to prompt the third communication device not transmit to the first communication device during the second time interval, wherein the second time interval corresponds to the first time interval.

18 Claims, 9 Drawing Sheets

(56) References Cited

U.S. PATENT DOCUMENTS

| | | | |
|---|---|---|---|
| 8,094,597 | B1 | 1/2012 | Chhabra et al. |
| 8,121,068 | B2 | 2/2012 | Zhu |
| 8,705,427 | B1 | 4/2014 | Chhabra et al. |
| 9,119,025 | B1 | 8/2015 | Chhabra et al. |
| 9,337,987 | B1 | 5/2016 | Choi et al. |
| 9,503,245 | B1 | 11/2016 | Choi et al. |
| 2002/0136233 | A1 | 9/2002 | Chen et al. |
| 2002/0181492 | A1 | 12/2002 | Kasami et al. |
| 2003/0093513 | A1 | 5/2003 | Hicks et al. |
| 2005/0059347 | A1 | 3/2005 | Haartsen |
| 2007/0153749 | A1 | 7/2007 | Waxman |
| 2007/0197256 | A1 | 8/2007 | Lu et al. |
| 2008/0279163 | A1 | 11/2008 | Desai |
| 2009/0245216 | A1 | 10/2009 | Banerjea et al. |
| 2011/0097998 | A1 | 4/2011 | Ko et al. |
| 2012/0164948 | A1 | 6/2012 | Narasimha et al. |
| 2013/0114583 | A1 | 5/2013 | Park et al. |
| 2013/0194938 | A1 | 8/2013 | Immonen et al. |
| 2014/0126552 | A1 | 5/2014 | Dayal et al. |

OTHER PUBLICATIONS

"Wi-Fi Display Technical Specification Version 1.0.0," Wi-Fi Alliance® Technical Committee, Wi-Fi Display Technical Task Group, 149 pages (Aug. 24, 2012).
"Wi-Fi Peer-to-Peer (P2P) Technical Specification, Version 1.00," Wi-Fi Alliance, pp. 1-135, Dec. 1, 2009.
"WiFi™ and Bluetooth#—Interference Issues," HP, dated Jan. 2002, 6 pages.
3GPP TR 36.816 V11.2.0, "3rd Generation Partnership Project; Technical Specification Group Radio Access Network; Evolved Universal Terrestrial Radio Access (E-UTRA); Study on Signaling and Procedure for Interference Avoidance for In-Device Coexistence (Release 11)", 44 pages (Dec. 2011).
Chen, "Home Network Basis: Transmission Environments and Wired/Wireless Protocols," Prentice Hall, pp. 1-26 (Jul. 2003).
Golmie et al., "Bluetooth and WLAN Coexistence: Challenges and Solutions," IEEE Wireless Comm., vol. 10, No. 6, pp. 22-29, (2003).
Harada, "Project: IEEE P802.15 Working Group for Wireless Personal Area Network (WPANs)," IEEE 802.15-07-0693-003c, slides 24-33 (May 2007).
Hiertz et al., "The IEEE 802.11 Universe," IEEE Communications Magazine, pp. 62-70, (Jan. 2010).
IEEE 802.20-PD-06; IEEE P 802.20™V14, Draft 802.20 Permanent Document; <System Requirements for IEEE 802.20 Mobile Broadband Wireless Access Systems—Version 14>, 24 pages (Jul. 16, 2004).
IEEE Std 802.11™—2012 (Revision of IEEE Std 802.11-2007) "IEEE Standard for Information technology—Telecommunications and information exchange between systems—Local and metropolitan area networks—Specific requirements—Part 11: Wireless LAN Medium Access Control (MAC) and Physical Layer (PHY) specifications," The Institute of Electrical and Electronics Engineers, Inc., 2,000 pages (2012).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-446 (Jul. 2013).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).
IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band The Institute of Electrical and Electronics Engineers, Inc., pp. 1-679 (Jul. 2012).
IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, The Institute of Electrical and Electronics Engineers, Inc., 2558 pages (Aug. 17, 2012).
IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Quinnell, "WiFi and Bluetooth Fight for Bandwidth," EDN, 4 pages (Aug. 4, 2005).
Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core

(56) References Cited

OTHER PUBLICATIONS

System Package [Controller Volume]", pp. 1-814; vol. 4, "Core System Package [Host Volume]," pp. 1-250, (Nov. 4, 2004).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Wojtiuk, "Bluetooth and WiFi Integration: Solving Co-Existence Challenges," RF Design, 4 pages (Oct. 2004).

U.S. Appl. No. 12/260,867, Chhabra et al., "Method and Apparatus for Coexistent WLAN and PAN Communication with Intelligent PAN Slot Suppression," filed Jan. 9, 2012.

U.S. Appl. No. 12/260,875, Chhabra et al., "Method and Apparatus for Coexistent Wireless and Bluetooth Communication Using Power Save Polling," filed Dec. 14, 2011.

U.S. Appl. No. 12/260,995, Chhabra et al., "Method and Apparatus for Using Power Management Mode to Regulate Data Transmission when a Bluetooth Network and a Wireless Local Area Network Coexist," filed Oct. 29, 2008.

METHOD AND SYSTEM FOR MITIGATING INTERFERENCE BETWEEN DIFFERENT RADIO ACCESS TECHNOLOGIES UTILIZED BY A COMMUNICATION DEVICE

CROSS REFERENCE TO RELATED APPLICATIONS AND INCORPORATION BY REFERENCE

This application is a continuation of U.S. patent application Ser. No. 14/136,860, entitled "Method and System for Mitigating Interference Between Different Radio Access Technologies Utilized by a Communication Device," filed on Dec. 20, 2013, which claims the benefit of U.S. Provisional Application No. 61/740,294, entitled "Wi-Fi Receiver Feedback for In-Device Coexistence (IDC)," and filed on Dec. 20, 2012. The disclosures of all of the applications referenced above are hereby incorporated herein by reference in their entireties.

FIELD OF THE DISCLOSURE

The present disclosure relates generally to communication networks and, more particularly, to methods and systems for mitigating interference between different radio access technologies (RAT) utilized by a communication device.

BACKGROUND

Wireless communication networks such as wireless wide area networks (WWAN), wireless local area networks (WLAN), and wireless personal area networks (WPAN) have become increasingly common, with different types of networks (and the corresponding wireless technologies) frequently coexisting in a single communication device. For example, user devices (e.g., mobile handsets) designed to operate using a cellular technology (e.g., Long Term Evolution (LTE) cellular technology) are increasingly designed to also use other wireless technologies, such as Wi-Fi and/or Bluetooth, that operate in the same or nearby frequency bands. Moreover, communications utilizing the various wireless technologies often occur simultaneously. For example, a user device may transmit data on a cellular uplink channel while receiving data via a Wi-Fi interface. As a result of this increasing coexistence, interference between different wireless technologies has become a significant problem.

SUMMARY OF THE DISCLOSURE

The present disclosure provides methods and apparatus for mitigating interference between different radio access technologies utilized by a communication device.

In an embodiment, a method includes communicating between a first communication device and a second communication device according to a first communication protocol and communicating between the first communication device and a third communication device according to a second communication protocol. The method further includes determining, at the first communication device, timing information associated with transmissions between the first communication device and the second communication device according to the first communication protocol. The method further includes determining, at the first communication device, a timing parameter based on the determined timing information, the timing parameter associated with transmissions between the first communication device and the third communication device according to the second communication protocol, the timing parameter determined to mitigate interference between i) transmissions between the first communication device and the second communication device according to the first communication protocol, and ii) transmissions between the first communication device and the third communication device according to the second communication protocol. The method further includes sending, from the first communication device to the third communication device, the timing parameter to affect transmissions between the first communication device and the third communication device according to the second communication protocol.

In another embodiment, an apparatus includes a first radio access technology (RAT) transceiver configured to communicate with a second communication device according to a first communication protocol and a second RAT transceiver configured to communicate with a third communication device according to a second communication protocol. The apparatus further includes a message and timing control module configured to determine timing information associated with transmissions between the first communication device and the second communication device according to the first communication protocol, and to determine a timing parameter based on the determined timing information, the timing parameter associated with transmissions between the first communication device and the third communication device according to the second communication protocol, the timing parameter determined to mitigate interference between i) transmissions between the first communication device and the second communication device according to the first communication protocol, and ii) transmissions between the first communication device and the third communication device according to the second communication protocol, and to cause the second RAT transceiver to send to the third communication device the timing parameter to affect transmissions between the first communication device and the third communication device according to the second communication protocol.

In another embodiment, a method includes communicating between a first communication device and a second communication device according to a first communication protocol, and communicating between the first communication device and a third communication device according to a second communication protocol. The method further includes determining, at the first communication device, a first time interval associated with when data is to be transmitted between the first communication device and the second communication device according to the first communications protocol, and sending, from the first communication device to the third communication device, an indication of a second time interval to prompt the third communication device not transmit to the first communication device during the second time interval, wherein the second time interval corresponds to the first time interval.

In another embodiment, an apparatus includes a first radio access technology (RAT) transceiver configured to communicate with a second communication device according to a first communication protocol and a second RAT transceiver configured to communicate with a third communication device according to a second communication protocol. The apparatus further includes a message and timing control module configured to determine a first time interval associated with when data is to be transmitted between the first communication device and the second communication device according to the first communications protocol, and cause the second RAT transceiver to send, to the third communication device, an indication of a second time interval to prompt the third communication device not transmit to the first communication device during the second time interval, wherein the second time interval corresponds to the first time interval.

DETAILED DESCRIPTION

Figure 1:
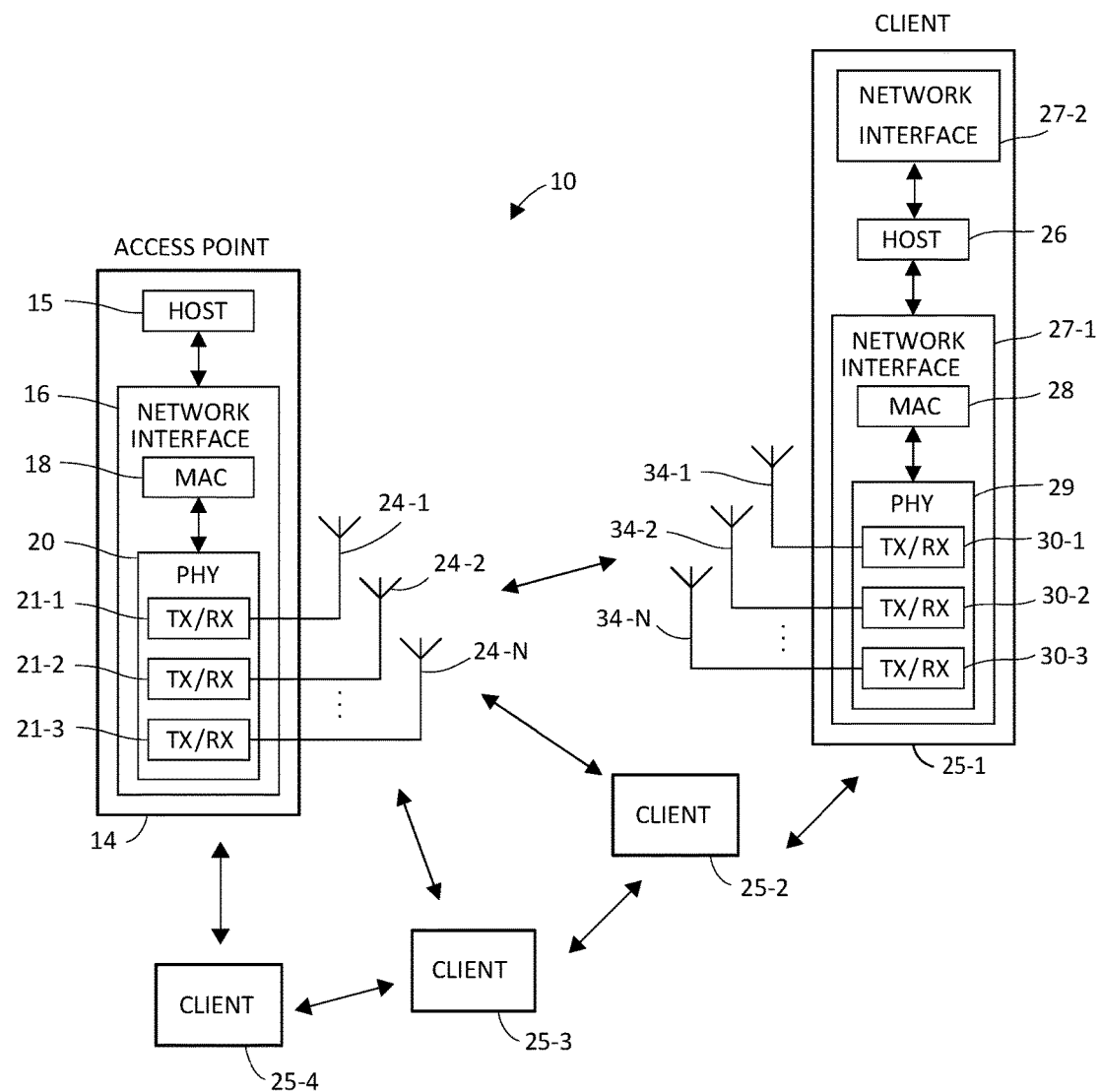
FIG. 1 is a block diagram of an exemplary network 10 in which one or more communication devices utilize interference mitigation techniques in accordance with an embodiment of the present disclosure.

FIG. 1 is a block diagram of an exemplary network 10 in which one or more communication devices utilize interference mitigation techniques in accordance with an embodiment of the present disclosure. An access point (AP) 14 includes a host processor 15 coupled to a network interface 16. Network interface 16 includes a medium access control (MAC) unit 18 and a physical layer (PHY) unit 20. PHY unit 20 includes a plurality of transceivers 21, which are coupled to a plurality of antennas 24. As will be appreciated by those of skill in the art, although three transceivers 21 and three antennas 24 are illustrated in FIG. 1, various embodiments of AP 14 include any number (e.g., 1, 2, 4, 5, etc.) of transceivers 21 and antennas 24. Further in accordance with various embodiments, any number of transceivers 21 are coupled to any number of antennas 24, such that one or more antennas are shared between transceivers and vice versa.

Network 10 includes a plurality of client stations 25. Although four client stations 25 are illustrated in FIG. 1, various embodiments of network 10 include any number (e.g., 1, 2, 3, 5, 6, etc.) of client stations 25. A client station 25-1 includes a host processor 26 coupled to a plurality of network interfaces 27. Network interface 27-1 includes a MAC processing unit 28 and a PHY processing unit 29. PHY processing unit 29 includes a plurality of transceivers 30, which are coupled to a plurality of antennas 34. Network interface 27-2 has a similar structure as network interface 27-1, i.e., with a corresponding MAC unit, PHY unit, one or more transceivers and one or more antennas. In some embodiments, one or more antennas are shared by network interface 27-1 and network interface 27.2. In some embodiments, network interface 27-1 and network interface 27-2 correspond to different radio access technologies (RATs). Although three transceivers 30 and three antennas 34 are illustrated in FIG. 1, various embodiments of client station 25-1 include any number (e.g., 1, 2, 4, 5, etc.) of transceivers 30 and antennas 34.

In accordance with various embodiments of the present disclosure, any number of client stations 25-2, 25-3, and 25-4 has a structure the same as or substantially similar to client station 25-1. In accordance with such embodiments, client stations 25 structured the same as or substantially similar to client station 25-1 include any suitable number of transceivers and antennas. For example, although client station 25-1 is illustrated as having three transceivers 34 and antennas 30, various embodiments of client station 25-2 have two transceivers and two antennas, etc. The number of antennas and transceivers associated with clients 25-2, 25-3, and 25-4 is not shown in FIG. 1 for purposes of brevity.

Network 10 supports communications in accordance with any number of suitable RATs and/or suitable communication protocols, such as cellular protocols, wireless local area network (WLAN) communication protocols specified by one or more IEEE standards, BLUETOOTH®, WiMAX, etc. Examples of suitable IEEE standards include 802.11a, 802.11, g, 802.11n, 802.11ac, 802.11ad, 802.11af, and/or 802.11ah standards. Although AP 14 is labeled as an access point, various embodiments of AP 14 are configured to support any suitable type of wireless communications and are not limited to supporting only WLAN technologies. For example, various embodiments of AP 14 are configured to support WLAN and/or cellular RATs such as 3rd Generation Partnership Project (3GPP) technologies including Long Term Evolution (LTE) protocols. Although FIG. 1 illustrates only a single AP 14, various embodiments of client devices 25 are configured to communicate with more than a single AP at any time, including simultaneous communications with separate APs using RATs that may be the same or different from one another. In accordance with an embodiment of the present disclosure, AP 14 and client stations 25 are configured to transmit and receive data conforming to one or more communication protocols and/or IEEE 802.11 standards. In accordance with another embodiment of the present disclosure, client stations 25 are configured to transmit and receive data with one another conforming to one or more communication protocols and/or IEEE 802.11 standards to support ad-hoc networking.

In accordance with various embodiments, AP 14 and/or client stations 25 are configured to determine one or more parameters related to a particular communication protocol associated with a RAT. AP 14 and clients 25 are configured to send this information to other communication devices within network 10, such as other clients 25 and/or AP 14. In various embodiments, AP 14 and/or clients 25 further communicate and use this information to adjust one or more parameters related to a communication protocol associated with another RAT and/or to adjust scheduled time intervals reserved for communications. In this way, portions of communications between i) one or more RATs within a single client 25 and ii) a) AP 14 and/or b) another client 25 are adjusted to not overlap with one another during one or more intervals of time. As a result, interference caused by otherwise overlapping communications sent to and/or received from AP 14 and/or another client device 25 is mitigated.

Figure 2:
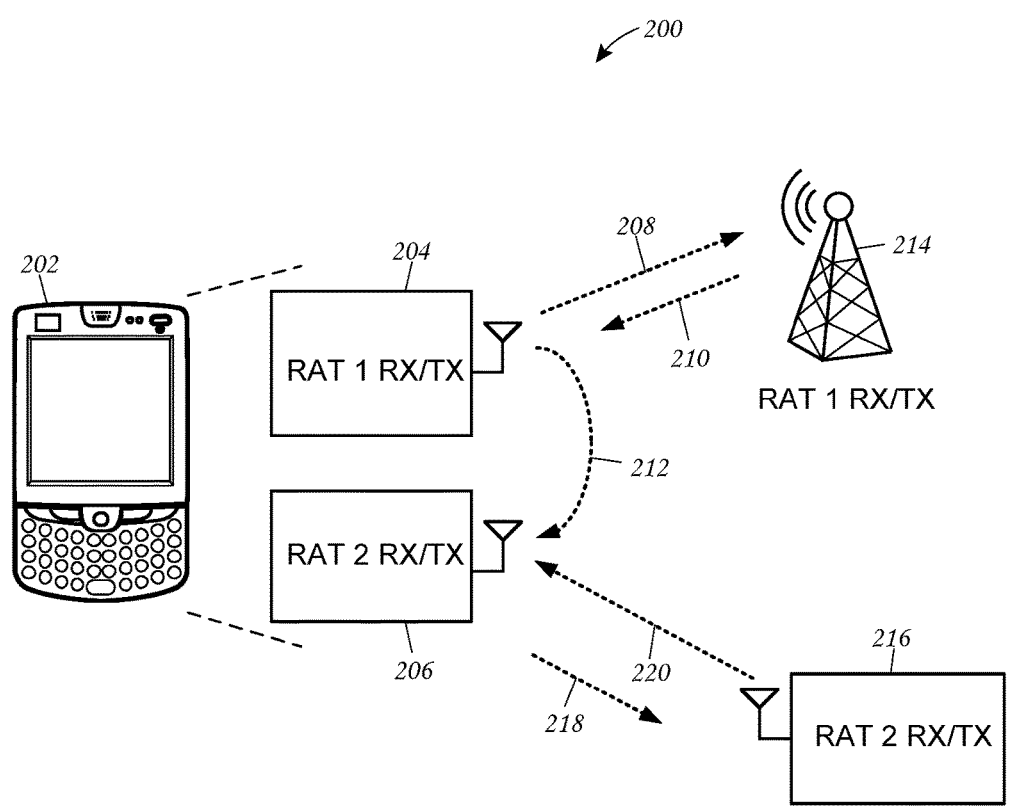
FIG. 2 is a block diagram of an exemplary multiple radio access technology (RAT) network environment 200 in accordance with an embodiment of the present disclosure.

FIG. 2 is a block diagram of an exemplary multiple radio access technology (RAT) network environment 200 in accordance with an embodiment of the present disclosure. Network environment 200 includes communication device 202, AP 214, and AP 216. Network environment 200 illustrates communication device 202 communicating with separate APs 214 and 216 implementing different radio access technologies (RATs 1 and 2) in accordance with an embodiment of the present disclosure. In other embodiments, AP 214 and/or AP 216 are not access points, but rather non-access point devices such as client devices.

Communication device 202 includes RAT transceiver 204 and RAT transceiver 206 to enable in-device coexistent (IDC) communications with APs 214 and 216, respectively. In accordance with an exemplary embodiment of the present disclosure, communication device 202 is a user equipment (UE) device, such as a smartphone, for example. RAT transceiver 204 transmits data to AP 214 via uplink path 208 and receives data from AP 214 via downlink path 210. Similarly, RAT transceiver 206 transmits data to AP 216 via uplink path 220, and receives data from AP 216 via downlink path 218. In various embodiments, communication device 202 implements any number of transceivers to communicate with any number of APs in accordance with any type of respective RAT. In accordance with an embodiment of the present disclosure, RAT transceivers 204 and 206 utilize different RATs. For example, RAT transceiver 204 may implement a cellular communication protocol such as the 3GPP LTE protocol, while RAT transceiver 206 may implement a WLAN protocol such as according to the IEEE 802.11ac Standard.

Different RAT communication protocols may occur over separate frequencies and/or frequency bands. Frequency band overlap, spectral proximity, harmonics, and/or differences in allowed transmit power (such as differences in licensed versus unlicensed bands), however, may cause interference when receiving communications in one RAT while transmitting in another. For example, uplink transmissions from RAT transceiver 204 to AP 214 may partially couple back into communication device 202 via coupling path 212, in some embodiments and/or scenarios. In other words, if communication device 202 is receiving communications from AP 216 during transmissions to AP 214, the received communications may be prone to interference and/or data corruption due to this self-coupling.

In accordance with an embodiment of the present disclosure, communication device 202 mitigates this potential interference by adjusting one or more parameters of one RAT communication protocol based on timing associated with another RAT communication protocol. For example, using RAT transceiver 204, communication device 202 determines timing information associated with communications via a first communication protocol used for communications between communication device 202 and AP 214. In various embodiments, this timing information is determined according to a clock synchronization between RAT transceiver 204 and AP 214 and/or other information that is indicative of a communications schedule. Once a communications schedule is determined, timing information associated with the schedule is sent to AP 216. In response to this information, AP 216 and communication device 202 negotiate one or more adjustments to parameters associated with the communications protocol used for communications between RAT transceiver 206 and AP 216 and/or time intervals indicating when RAT transceiver 206 is available to communicate with AP 216.

In accordance with various embodiments of the present disclosure, negotiations between communication protocol parameters and available time intervals may be initiated by communication device 202 or AP 216. Further in accordance with various embodiments, the timing information is sent to AP 216 at various suitable times. For example, timing information may be sent to AP 216 during a period of initial association between communication device 202 and AP 216, and/or during communication with the AP 216 at some other suitable time after the initial association. By adjusting timing intervals of communications and/or parameters associated with communication protocols, portions of communications between communication device 202 and APs 214 and 216 are adjusted so they do not overlap in time. In this way, communication device 202 mitigates interference created through IDC communications.

Figure 3:
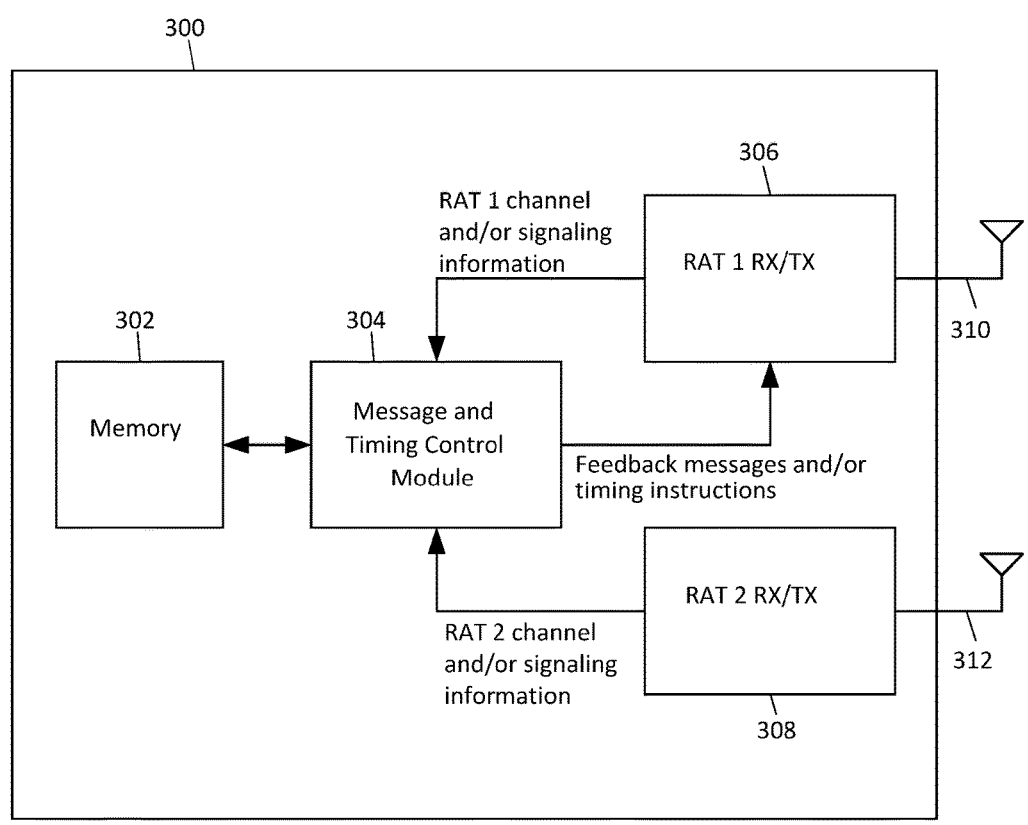
FIG. 3 is a block diagram of an exemplary interference mitigation management system 300 in accordance with an embodiment of the present disclosure.

FIG. 3 is a block diagram of an exemplary interference mitigation system 300 in accordance with an embodiment of the present disclosure. Interference mitigation system 300 includes memory device 302, message and timing control module 304, RAT transceiver 306, RAT transceiver 308, antenna 310, and antenna 312. In accordance with an embodiment of the present disclosure, RAT transceiver 306 and RAT transceiver 308 are exemplary embodiments of transceivers 21 and 30 (FIG. 1), respectively, and RAT transceivers 204 and 206 (FIG. 2), respectively.

In accordance with an embodiment of the present disclosure, interference mitigation system 300 is implemented as part of a communication device, such as AP 14 and/or client 25 (FIG. 1), and communication device 202, AP 214 and/or AP 216 (FIG. 2). RAT transceivers 306 and 308 are coupled to antennas 310 and 312, respectively, and are configured to enable communications between the device in which they are implemented and one or more other communication devices in accordance with respective RAT communication protocols. Transceivers 306 and 308 are configured to facilitate any suitable level of communications in accordance with any RAT communication protocol. As will be appreciated by those of ordinary skill in the art, in various embodiments transceivers 306 and 308 include, for example, any suitable number of modulators, demodulators, mixers, phase locked loops, oscillators, and/or frequency synthesizers, to facilitate such communications.

RAT transceiver 306 and/or 308 is configured to determine channel and/or signaling information regarding their respective RAT communication protocols and to provide this information to message and timing control module 304. Channel and/or signaling information may include any suitable information regarding parameters of a communication protocol, channel state, and/or channel availability. Examples of suitable channel and/or signaling information include information regarding the availability of communications on one or more particular channels and/or availability of one or more communication devices and/or APs, timing associated with current and/or expected communications over a respective RAT communications protocol, beacon information identifying a source of received communications, packet size, packet aggregation information, information associated with data received and transmitted in accordance with the RAT communication protocol such as packet header, packet length, and/or payload information, RAT communication protocol type, etc. RAT transceiver 306 and/or 308 is configured to receive feedback messages and/or timing instructions sent from message and timing control module 304. In some embodiments, RAT transceiver 306 is configured to send information included in the feedback messages to another communication device, such as communication device 202 and/or APs 214 and 216, for example. In various embodiments, RAT transceiver 306 adjusts one or more communication protocol timing parameters in response to timing instructions received from message and timing control module 304. In accordance with an embodiment of the present disclosure, RAT transceiver 306 is a WLAN transceiver and RAT transceiver 312 is a 3GPP LTE transceiver. In other embodiments, the RAT transceiver 306 and/or the RAT transceiver 312 are configured to operate according to other suitable communication protocols.

Message and timing control module 304 is configured to receive the channel and/or signaling information from RAT transceiver 306 and/or 308. In accordance with an exemplary embodiment of the present disclosure, message and timing control module 304 is a processor that executes machine readable instructions (e.g., software instructions or firmware instructions) stored in a memory device (e.g., the memory device 302 or another memory device (not shown)). Based on this information, message and timing control module 304 determines feedback messages and/or timing instructions to send back to RAT transceiver 306 and/or 308. In various embodiments of the present disclosure, feedback messages include "blackout" or unavailable time periods associated with when RAT transceiver 306 is unavailable to receive communications, information indicative of the timing adjustment instructions sent to RAT transceiver 308, and/or any information indicative of the channel and/or signaling information received via RAT transceiver 308. In accordance with various embodiments, message and timing control module 304 is configured to determine the timing adjustments to be made at RAT transceiver 306 based on the channel and/or signaling information received from RAT transceiver 308.

In accordance with an embodiment of the present disclosure, RAT transceiver 308 is configured to operate in accordance with a RAT communication protocol that utilizes clock synchronization, such as LTE, for example. This clock synchronization system allows for RAT transceiver 308 to synchronize clock timing with the source device or AP (e.g., an e-Node B) based on communications received. Since communications in accordance with this communication protocol are predictable based on the clock synchronization, message and timing control module 304 exploits this information to generate the feedback messages and/or timing instructions sent to RAT transceiver 306. Many communication protocols, such as Wi-Fi, utilize communication protocols having adjustable timing parameters but occur at somewhat random intervals. As a result, embodiments in which RAT transceiver 308 conforms to a communication protocol with a predictable timing are particularly useful for management of interference mitigation.

Message and timing control module 304 is coupled to memory device 302 and is configured to communicate with memory device 302 in order to store to and read data from the memory device 302. In accordance with various embodiments of the present disclosure, memory device 302 includes a volatile (e.g., a random access memory (RAM), or a non-volatile memory (e.g., battery backed RAM, FLASH, etc.). In various embodiments of the present disclosure, memory device 302 stores data related to a logged history of channel and/or signaling information, timing instructions and/or feedback messages sent to RAT transceiver 306, communication device identifiers, queued data and/or packets, etc. Message and timing control module 304 optionally reads data from memory device 302 to correlate a particular set of communication devices and/or APs in communication with RAT transceivers 306 and 308 with one more previously sent feedback messages and/or timing instructions. This process is useful in at least some embodiments in which interference mitigation system 300 is implemented within a UE device with limited processing power and/or battery life, since it conserves processing time, processing power, and/or battery life.

Figure 4A:
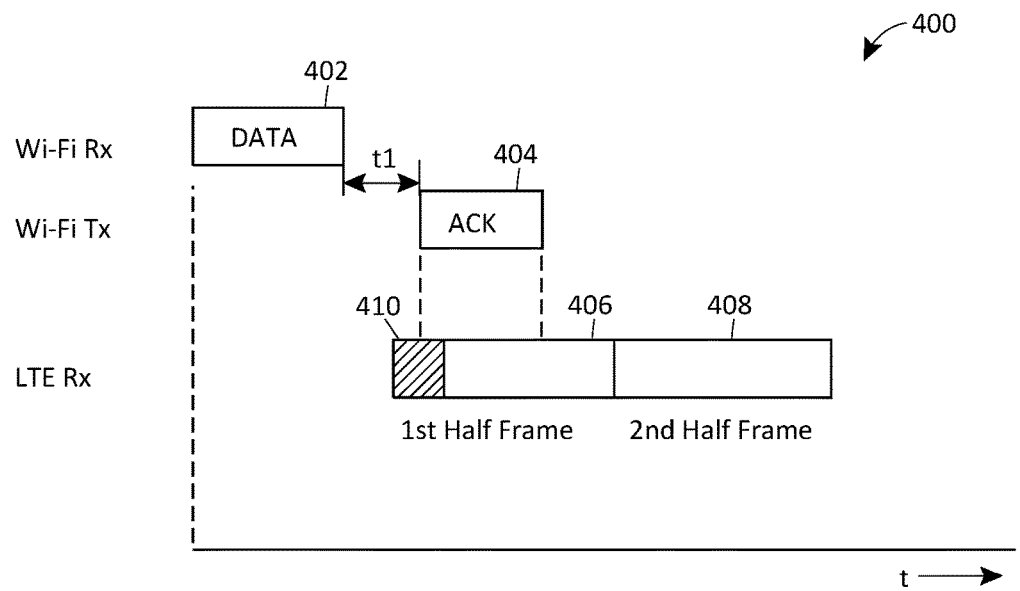
FIG. 4A is an exemplary timing diagram 400 illustrating potential interference in communications received from a communication device in accordance with an embodiment of the present disclosure.

FIG. 4A is an exemplary timing diagram 400 illustrating potential interference in communications received from a communication device in accordance with an embodiment of the present disclosure. Timing diagram 400 shows a timeline of communications corresponding to two separate communication protocols. In accordance with an exemplary embodiment of the present disclosure, Wi-Fi Tx and Rx data corresponds to communications associated with RAT transceiver 306, while LTE Rx data corresponds to communications associated with RAT transceiver 308. Further in accordance with such an embodiment, FIG. 4A represents a timing diagram prior to adjustments being performed at RAT transceiver 306.

As shown in FIG. 4A, Wi-Fi communications include receiving a data packet 402 and transmitting an acknowledgement (ACK) packet 404 a time length t1 after data packet 402 is received to acknowledge receipt of the data packet 402. As will be appreciated by those of ordinary skill in the art, in various embodiments of the present disclosure, a block acknowledge (BA) packet is sent in lieu of the ACK packet when receiving data packets in a data block structure, such as packet aggregation mode, for example. Thus, in some embodiments, the ACK packet 404 may correspond to a BA that acknowledges receipt of multiple data packets.

In accordance with LTE protocol standards, LTE frames are 10 ms in length and are repeated one after another. Each LTE frame includes two half frames of 5 ms duration. FIG. 4A also shows LTE communications of receipt of a single LTE frame for simplicity, which includes half frames 406 and 408. Also in accordance with LTE standards, the first half-frame of every LTE frame includes a master information block (MIB), which is shown in FIG. 4A as MIB 410. MIB 410 includes a small amount of data that is repeated in accordance with LTE protocol on each first half frame. This data represents information that is initially utilized to establish communications between an LTE access point (e-Node B), and a communication device. Such information includes downlink channel bandwidth, Physical Hybrid-ARQ Indicator Channel (PHICH) configuration, PHICH duration, PHICH resource, and a System Frame Number. Since the MIB includes information necessary for LTE communications to occur, receipt of MIB 410 within half frame 406 is a high priority, at least in some embodiments.

As shown in FIG. 4A, an ACK transmission 404 and receipt of MIB 410 may overlap during a period of time. In such a case, self-coupling within a communication device could cause interference that would prevent a communication device from successfully reading MIB 410. In this case, the next MIB (not shown) transmitted in the next frame would need to be read. If multiple MIBs are unable to be read due to multiple ACK transmissions over a period of time, LTE communication efficiency and speed would suffer as a result.

Figure 4B:
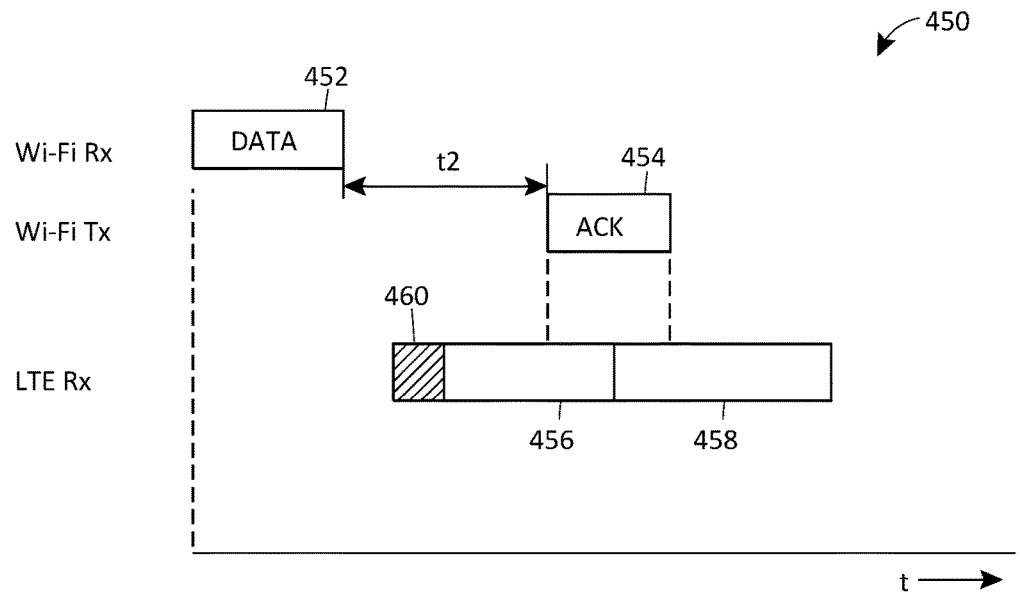
FIG. 4B is an exemplary timing diagram 450 illustrating timing adjustments to mitigate interference in communications received from a communication device in accordance with an embodiment of the present disclosure.

FIG. 4B is an exemplary timing diagram 450 illustrating timing adjustments to mitigate interference in communications received from a communication device in accordance with an embodiment of the present disclosure. Timing diagram 450 shows a timeline of communications corresponding to the communication protocols as described in FIG. 4A. In an embodiment, FIG. 4B illustrates adjustments made to Wi-Fi communications to mitigate interference. As shown in FIG. 4B, Wi-Fi communications include a receiving a data packet 452 and transmitting an acknowledgement (ACK) packet 454 a time length t2 after data packet 452 is received to acknowledge receipt of data packet 452. LTE communication again includes receipt of half-frames 456 and 458, with MIB 460 included in half frame 456.

In accordance with an embodiment of the present disclosure, message and timing control module 304 compares the timing between Wi-Fi and LTE communications. Because LTE communications rely on synchronized and periodic frame transmissions, message and timing control module 304 determines that the ACK timing shown in FIG. 4A has occurred when an LTE MIB 460 should have been received. In response, message and timing control module 304 generates a feedback message to be sent to another communication device (e.g., AP) in communication with RAT transceiver 306. The other communication device, in turn, adjusts the expected ACK timing to wait to receive ACK messages for additional time (i.e., t241) specified in the feedback message before determining that the packets have not been received and resending them. Although the aggregation of additional waiting period times may potentially decrease the performance of Wi-Fi, this is an acceptable result of improving the likelihood that critical portions of LTE data are received, at least in some embodiments.

Once the other communication device adjusts the expected ACK timing, message and timing control module 304 adjusts the ACK transmission timing of RAT transceiver 306 to match the new expected ACK timing. In accordance with embodiments of the present disclosure, message and timing control module 304 adjusts the ACK transmission timing a period of time after the feedback message is sent to the other communication device. By waiting for this period of time, message and timing control module 304 can ensure that the other communication device is provided adequate time to receive the message and make the proper adjustments. In accordance with another embodiment of the present disclosure, the other communication device sends a confirmation message back to RAT transceiver 306 indicting that either the suggested adjustments have been adopted, or else a new adjusted timing is requested. For example, communication device 300 and the other communication device may have different priority schedules, operating intervals, timing information, and/or processing tasks to consider. As a result, several messaging iterations between devices may occur until an adjustment ACK timing is successfully negotiated. As shown in FIG. 4B, once a new ACK transmission schedule is negotiated and adjusted, ACK transmissions no longer overlap with LTE MIB reception. In this way, interference mitigation management system 300 mitigates interference with LTE reception by ensuring important portions of LTE data communications are received.

Figure 5:
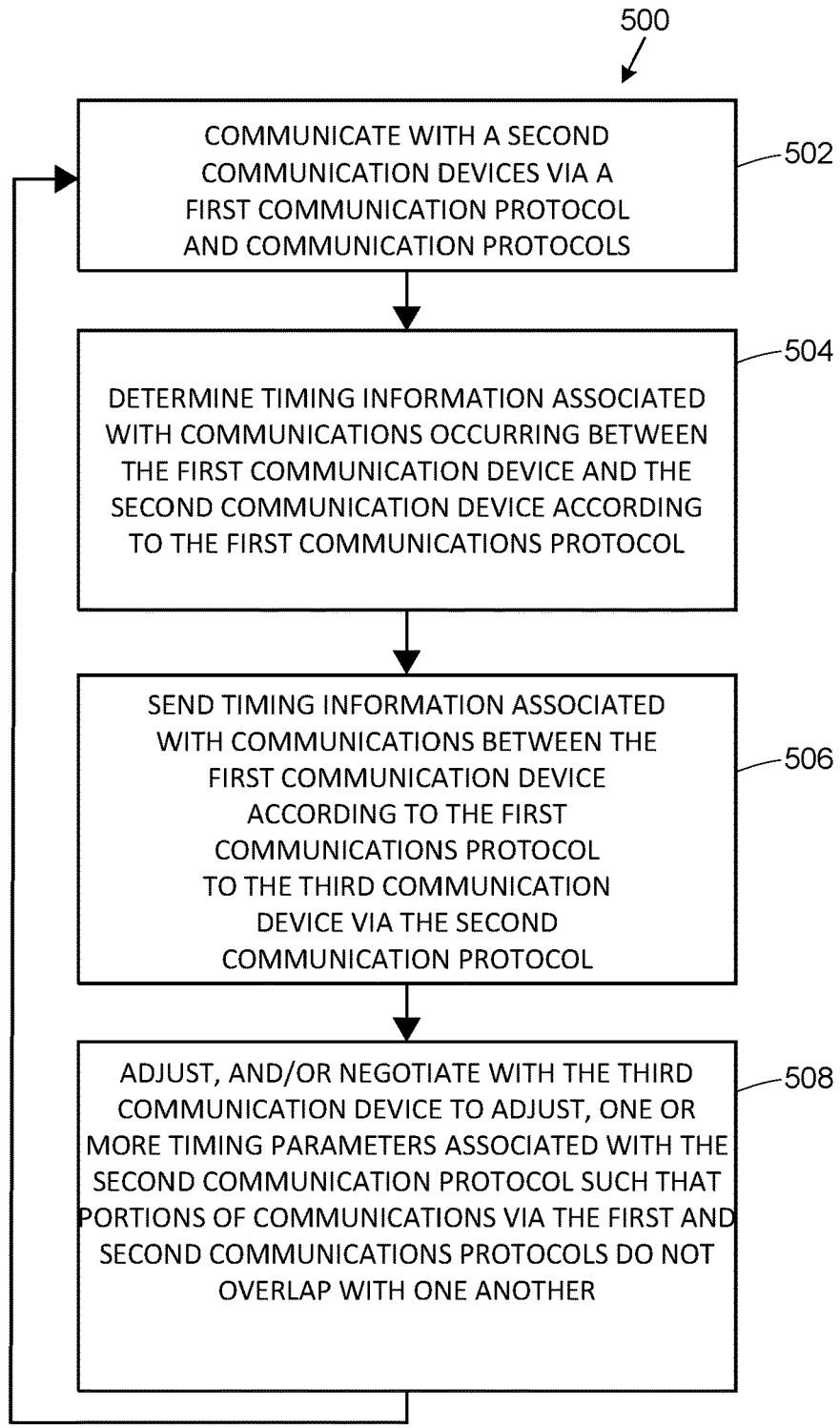
FIG. 5 illustrates a timing adjustment method 500 in accordance with an embodiment of the present disclosure.

FIG. 5 illustrates a timing adjustment method 500 in accordance with an embodiment of the present disclosure. In an exemplary embodiment of the present disclosure, method 500 is performed in a suitable communication device, such as one or more of communication device 25-1 and/or AP 14 (FIG. 1), communication device 202, AP 214, and/or AP 216 (FIG. 2), communication device 300 (FIG. 3), etc.

Method 500 begins at block 502, at which a first communication device communicates with a second communication device via a first communication protocol, and communicates with a third communication device via a second communication protocol. In accordance with an embodiment of the present disclosure, these communications may occur concurrently or substantially concurrently.

At block 504, the first communication device determines timing information associated with communications occurring between the first communication device and the second communication device according to the first communications protocol. This timing information could include, for example, frame timing associated with LTE transmit or receive communications. To provide another example, the timing information could include when an MIB block is expected to be received, as shown in FIGS. 4A-B, and/or a time interval associated with an expected LTE transmission being sent from the first communication device.

At block 506, the first communication device sends timing information associated with communications occurring between the first communication device and the second communication device according to the first communications protocol to the third communication device via the second communication protocol.

At block 508, the first communication device adjusts, and/or negotiates with the third communication device to adjust, one or more timing parameters associated with the second communication protocol such that portions of communications via the first and second communications protocols do not overlap with one another.

Method 500 may be repeated, in some embodiments. On subsequent iterations of method 500, blocks 506 and/or 508 may be skipped if the first communication device determines that adjustments to the one or more timing parameters are not needed.

Figure 6A:
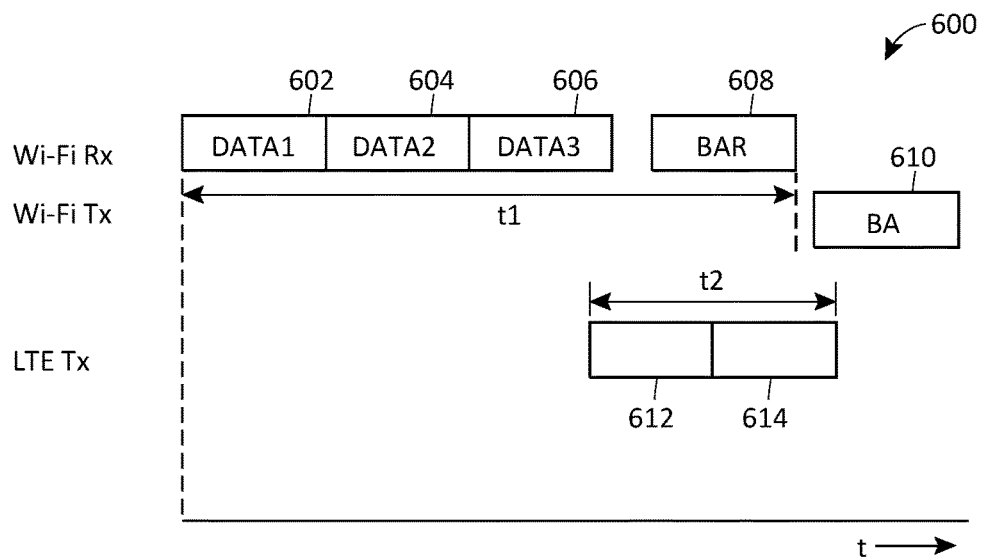
FIG. 6A is an exemplary timing diagram 600 illustrating potential interference in communications received from a communication device in accordance with an embodiment of the present disclosure.

FIG. 6A is an exemplary timing diagram 600 illustrating potential interference in communications received from a communication device in accordance with an embodiment of the present disclosure. Timing diagram 600 shows a timeline of communications corresponding to two separate communication protocols. In accordance with an exemplary embodiment of the present disclosure, Wi-Fi Tx and Rx data correspond to communications associated with RAT transceiver 306, while LTE Tx data corresponds to communications associated with RAT transceiver 308. Further in accordance with such an embodiment, FIG. 6A represents a timing diagram representing Wi-Fi communications operating according to a packet aggregation mode prior to adjustments being performed at RAT transceiver 306.

As shown in FIG. 6A, Wi-Fi communications include receiving an aggregated block of data packets 602, 604, and 606, along with a block acknowledge request (BAR) 608. A block acknowledgement (BA) packet 610 is also transmitted after the BAR is received to verify receipt of the aggregated block of data packets 602, 604, and 606. Although FIG. 6A illustrates an embodiment related to operation in packet aggregation mode, any of the embodiments as described herein apply to other Wi-Fi modes of operation, including individual ACK per packet operation. As shown in FIG. 6A, the total time to receive the block of data packets 602, 604, and 606 and BAR packet 608 occur over a time period t1.

FIG. 6A also shows LTE communications of a single transmitted LTE frame for ease of explanation, which includes half frames 612 and 614. The LTE transmission of half frames 612 and 614 occur over a time period t2. As shown in FIG. 6A, time periods t1 and t2 overlap. In other words, at least a portion of the LTE transmission 612, 614 occurs at the same time as a portion of Wi-Fi reception of packets 602, 604, 606, and 608. In such a case, self-coupling within a communication device could cause interference resulting in data packets 606 and/or 608 not being read. In this case, the BA 610 packet would not be sent and the aggregated packets 602, 604, 606 would then need to be resent by the communication device that originally sent the aggregated packets 602, 604, 606. If aggregated packets are not read due to LTE transmissions over a period of time, Wi-Fi communication efficiency and speed would suffer as a result.

Figure 6B:
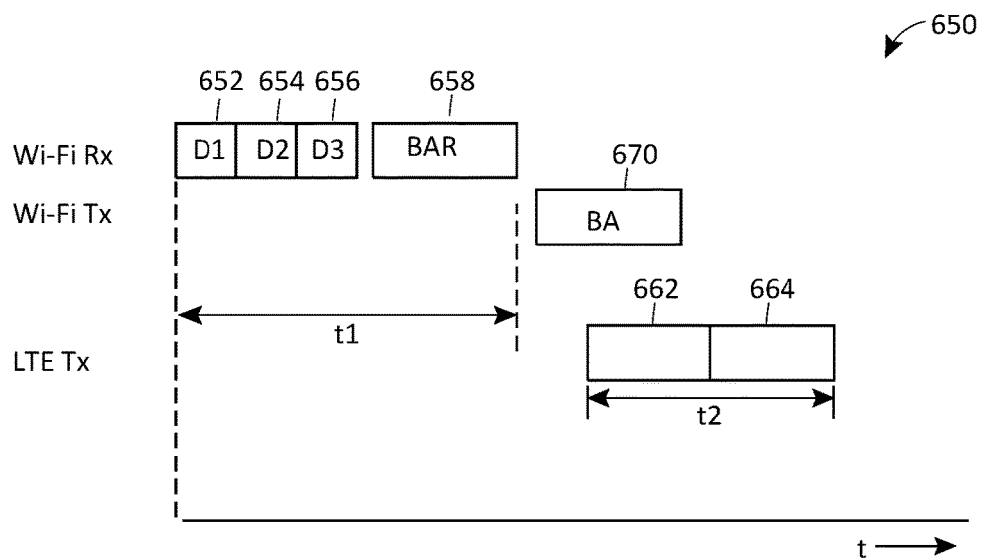
FIG. 6B is an exemplary timing diagram 650 illustrating aggregated packet size adjustments to mitigate interference in communications received from a communication device in accordance with an embodiment of the present disclosure.

FIG. 6B is an exemplary timing diagram 650 illustrating aggregated packet size adjustments to mitigate interference in communications received from a communication device in accordance with an embodiment of the present disclosure. Timing diagram 650 shows a timeline of communications corresponding to the communication protocols as described in FIG. 6A. In accordance with an embodiment of the present disclosure, FIG. 6B represents a timing diagram after adjustments associated with the Wi-FI protocol are performed. As shown in FIG. 6B, Wi-Fi communications include aggregated data packets 652, 654, 656, BAR packet 658, and BA packet 670 that is transmitted after data packets 652, 654, 656 are received to verify their receipt. Similar to the discussion with respect to FIG. 6A, while FIG. 6B illustrates a BA embodiment, any of the embodiments as described herein apply to other Wi-Fi modes of operation, including individual ACK per packet operation. As shown in FIG. 6B, the total time to receive the data block including data packets 652, 654, 656 and BAR 658 occurs over a time period t1. FIG. 6B also shows LTE communications of a single LTE frame including half frames 662 and 664, which occurs over a time period t2.

In accordance with an embodiment of the present disclosure, message and timing control module 304 compares the timing between Wi-Fi and LTE communications. Again, since LTE communications use synchronized and periodic frame transmissions, message and timing control module 304 determines that a portion of the aggregate packet timing shown in FIG. 6A corresponding to t1 has occurred when an LTE frame was also transmitted during t2. Since message and timing control module 304 has information regarding the length of the aggregated packet corresponding to packets 602, 604, and 606 and/or a maximum aggregated packet length that can be used when communicating via the Wi-Fi protocol, message and timing control module 304 determines a maximum aggregate packet size such that Wi-Fi aggregate packet reception and LTE transmission no longer overlap. Once the appropriate maximum aggregate packet size is determined, message and timing control module 304 generates a feedback message to be sent to the other communication device (e.g., AP) in communication with RAT transceiver 306, where the feedback message includes an indication of the new maximum aggregate packet size. The other communication device, in turn, adjusts the packet aggregation sizing according to the maximum length indicate in the feedback message. Although a reduced aggregate packet length may result in a decrease in the rate of Wi-Fi reception, this is an acceptable tradeoff to allow for IDC communications while avoiding retransmission of entire data blocks from lost packets resulting from interference, in some embodiments.

In some embodiments, once the other communication device adjusts the maximum aggregate packet length, message and timing control module 304 adjusts the maximum aggregate packet length utilized by the RAT transceiver 306 to match the new maximum aggregate packet length. In accordance with embodiments of the present disclosure, message and timing control module 304 adjusts the maximum aggregate packet length a period of time after the feedback message is sent. By waiting for this period of time, message and timing control module 304 can ensure that the other communication device is provided adequate time to receive the feedback message and to make the adjustments. In accordance with another embodiment of the present disclosure, the other communication device sends a confirmation message back to communication device 300 via the WiFi communication protocol indicting that either the suggested size adjustments have been adopted, or else a new maximum aggregate packet size is needed. Communication device 300 and the other communication device communicating via the Wi-Fi protocol may have different priority schedules, operating intervals, timing information, and/or processing tasks to consider. As a result, several messaging iterations between devices may occur until a maximum aggregate packet length is successfully negotiated. As shown in FIG. 6B, once a new maximum aggregate packet length and timing schedule are negotiated and adjusted, data block reception no longer overlaps with LTE transmission. In this way, interference mitigation management system 300 mitigates interference between Wi-Fi reception and LTE transmission by ensuring portions of Wi-Fi data reception and LTE data transmissions do not overlap.

In accordance with these embodiments, RAT transceiver 306 optionally performs one of several operations, such as discarding incoming packets and/or entering into a sleep mode during an LTE transmission. One or both of these operations may result in retransmission of Wi-Fi packets, increased processing and time due to wake-up overhead, etc. As a result, performing such operations may result in reduced efficiency of Wi-Fi performance as a tradeoff for IDC communication coexistence.

Further in accordance with various embodiments of the present disclosure whereby Wi-Fi signals continue to be received during other portions of LTE transmission, RAT transceiver 306 attempts to quiet the Wi-Fi channel. For example, in some embodiments, the channel is quieted by RAT transceiver 306 sending a ready to send (RTS) or equivalent signal to an AP or other communication device. In response to receiving the RTS, the AP or other communication device stops transmitting messages for a period of time based on a time period specified in the RTS signal. Since the AP or other communication device interprets the RTS signal as if the RAT transceiver intends to transmit (even if this is not actually the case) the AP or other communication device will stop transmitting to RAT transceiver 306 for a period of time. In accordance with various embodiments, message and timing control module 304 calculates a number of RTS signals to send such that an interval of time needed for LTE transmissions is adequately reserved. In accordance with various embodiments, the frequency and/or number of RTS signals sent is determined by data rate, packet size, latency, etc.

In additional embodiments, the channel is quieted, for example, by RAT transceiver 306 sending a clear to send (CTS) or equivalent signal addressed to itself with a time duration value that provides a time period in which RAT transceiver 306 does not transmit ACK signals. Since no ACK signals are sent back to the AP or other communication device for this period of time, data packets will continue to be resent by the AP or other communication device. Although the AP or other communication device will not interpret this as an explicit period of unavailability, this will help ensure data packets are resent by the AP or other communication device once ACK signal transmission resumes. In this way, RAT transceiver 306 unilaterally determines this period of unavailability without the need to send information and/or negotiate for this period of unavailability with the AP or other communication device. In accordance with various embodiments, message and timing control module 304 calculates the time value to send in the CTS to self message such that an interval of time needed for LTE transmissions is adequately reserved. In accordance with various embodiments, the time value is determined by data rate, packet size, latency, etc.

Preventing such Wi-Fi communications from occurring for the period of time may result in network resource inefficiency and/or network congestion. As a result, in accordance with an embodiment of the present disclosure, RAT transceiver 306 prioritizes the execution of one or more of these operations after maximum aggregated packet size is adjusted. As will be appreciated by those of skill in the art, any combination of discarding incoming packets, entering sleep mode, and/or quieting one or more channels are prioritized and used as needed based on desired network speed, reliability, etc.

Figure 7:
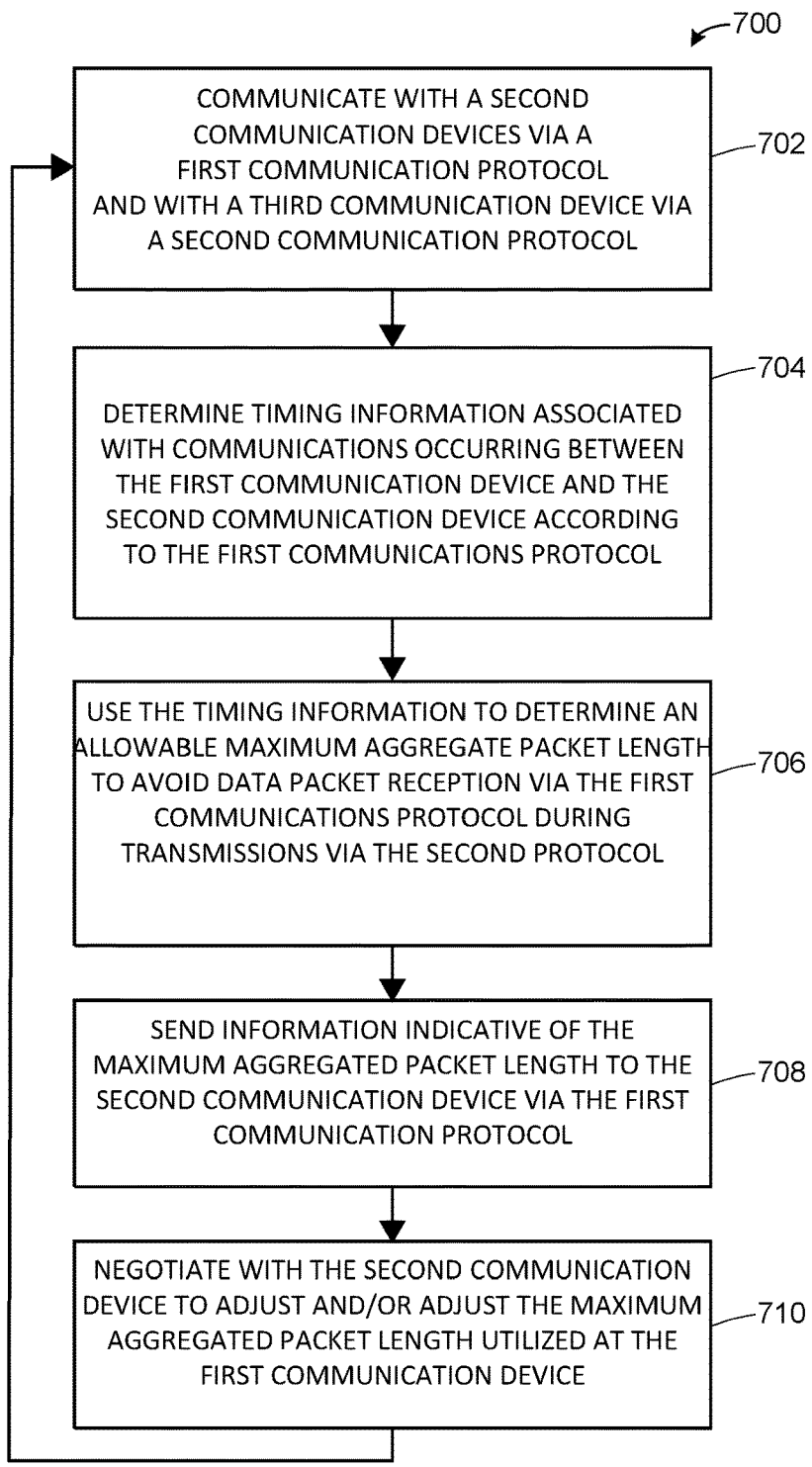
FIG. 7 illustrates an aggregated packet size adjustment method 700 in accordance with an embodiment of the present disclosure.

FIG. 7 illustrates an aggregated packet size adjustment method 700 in accordance with an embodiment of the present disclosure. In an exemplary embodiment of the present disclosure, process 700 is performed in a suitable communication device, such as one or more of communication device 25-1 and/or AP 14 (FIG. 1), communication device 202, AP 214, and/or AP 216 (FIG. 2), communication device 300 (FIG. 3), etc.

At block 702, a first communication device communicates with a second communication device via a first communication protocol, and communicates with a third communication device via a second communication protocol. In accordance with an embodiment of the present disclosure, these communications may occur concurrently or substantially concurrently.

At block 704, the first communication device determines one or more timing information associated with communications occurring with the second device via the first communication protocol. This timing information could include, for example, frame timing associated with LTE transmit or receive communications. To provide another example, the timing information could include a difference in timing between t1 and t2 as illustrated in FIGS. 6A-6B.

At block 706, the timing information determined at block 704 is used to determine an allowable maximum aggregated packet length to avoid data packet reception via the first communications protocol during transmissions via the second protocol.

At block 708, the first communication device sends information indicative of the maximum aggregated packet length to the second communication device via the first communication protocol.

At block 710, the first communication device negotiates with the second communication device to adjust and/or adjusts the maximum aggregated packet length utilized at the first communication device.

In some embodiments, block 710 is omitted.

Method 700 may be repeated, in some embodiments. On subsequent iterations of method 700, blocks 708 and/or 710 may be skipped if the first communication device determines that adjustments to the maximum aggregated packet length is not needed.

Figure 8A:
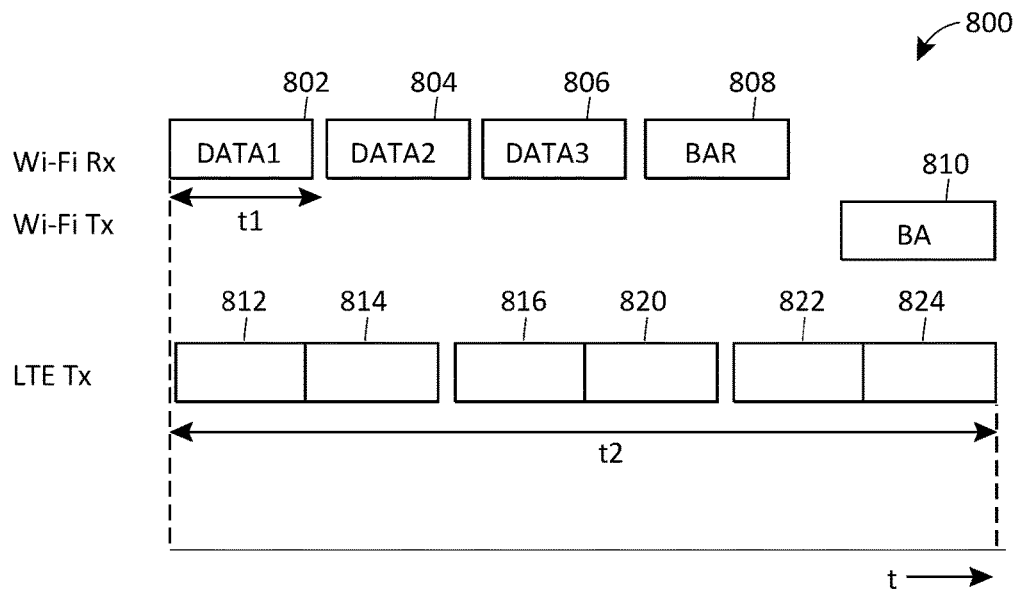
FIG. 8A is an exemplary timing diagram 800 illustrating a communications schedule having potential interference in communications received from a communication device in accordance with an embodiment of the present disclosure.

FIG. 8A is an exemplary timing diagram 800 illustrating a communications schedule having potential interference in communications received from a communication device in accordance with an embodiment of the present disclosure. Timing diagram 800 shows a timeline of communications corresponding to two separate communication protocols. In accordance with an exemplary embodiment of the present disclosure, Wi-Fi Tx and Rx data correspond to communications associated with RAT transceiver 306, while LTE Tx data corresponds to communications associated with RAT transceiver 308. Further in accordance with such an embodiment, FIG. 8A represents a timing diagram representing Wi-Fi communications in packet aggregation mode prior to notifications being sent regarding availability of reception by RAT transceiver 306.

As shown in FIG. 8A, Wi-Fi communications include receiving a block of data packets 802, 804, and 806, along with a block acknowledge request (BAR) 808. A block acknowledgement (BA) packet 810 is also transmitted after the BAR is received to verify receipt of the block of data packets 802, 804, and 806. Although FIG. 8A illustrates an embodiment related to operation in packet aggregation mode, any of the embodiments as described herein apply to other Wi-Fi modes of operation, including individual ACK per packet operation. As shown in FIG. 8A, the total time to receive the block of data packets 802, 804, and 806, and BAR packet 808 occurs over a time period t1.

FIG. 8A also shows LTE transmission of several LTE frames, each including respective half frames 852, 854, 856, 858, 860, and 862. The LTE transmission of half frames 852, 854, 856, 858, 860, and 862 occurs over a time period t2. As shown in FIG. 8A, time periods t1 and t2 overlap. In other words, at least a portion of the LTE transmission occurs at the same time as at least a portion of Wi-Fi reception. Again, self-coupling within a communication device could cause interference resulting in a communication device being unable to read the incoming data packets 802, 804, 806, and/or 808, resulting in the BA not being sent and requiring retransmission of the aggregated packets 802, 804, 806, and 808 by the host communication device and/or AP that originally sent them. If aggregated packets are not read due to LTE transmissions over a period of time, Wi-Fi communication efficiency and speed would suffer as a result.

Figure 8B:
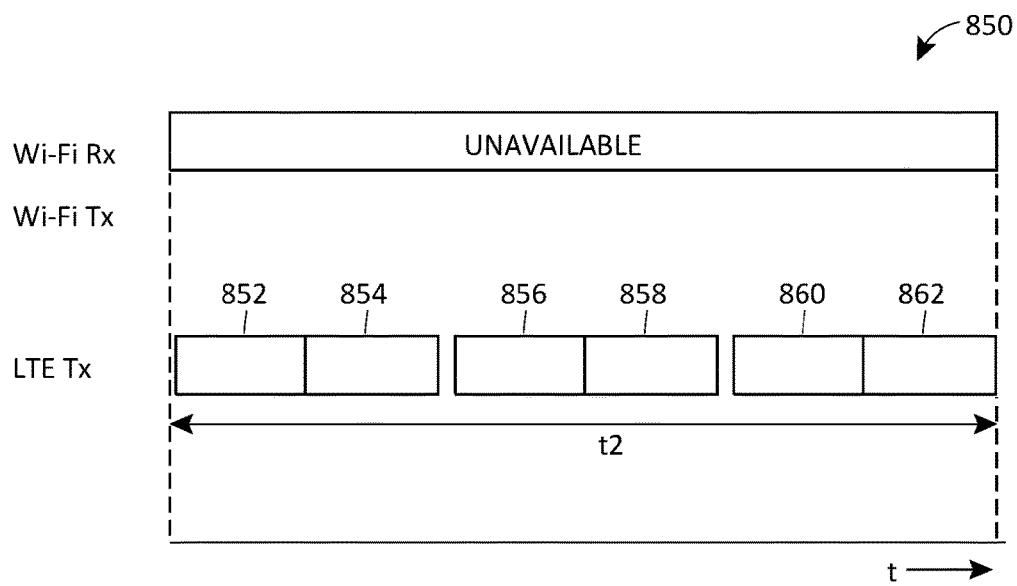
FIG. 8B is an exemplary timing diagram 850 illustrating adjustments to the communications schedule to allow for mitigated interference in communications received from a communication device in accordance with an embodiment of the present disclosure.

FIG. 8B is an exemplary timing diagram 850 illustrating adjustments to the communications schedule to mitigate interference in communications received from a communication device in accordance with an embodiment of the present disclosure. Timing diagram 850 shows a timeline of communications corresponding to the communication protocols as described in FIG. 8A. In accordance with an embodiment of the present disclosure, FIG. 8B represents a timing diagram after adjustments are performed by RAT transceiver 306 to indicate that transceiver 308 is unavailable to receive communications.

In accordance with an embodiment of the present disclosure, message and timing control module 304 compares the timing between Wi-Fi and LTE communications. Since LTE communications rely on synchronized and periodic frame transmissions, message and timing control module 304 is capable of determining when LTE frames need to be transmitted. Based on this timing information, reducing aggregate packet size may be impractical. This may be the case when, for example, LTE data communications are particularly heavy for a period of time, such as downloading or uploading a large file or using an application that requires a great deal of LTE bandwidth. Since message and timing control module 304 has information regarding minimum packet length requirements in accordance with Wi-Fi communication protocols, message and timing control module 304 may determine that even a minimum aggregate packet size would not eliminate overlaps between Wi-Fi and LTE communications.

In accordance with an exemplary embodiment of the present disclosure, message and timing control module 304 determines that aggregate packet size cannot be reduced to eliminate communications overlap, and generates a feedback message to be sent to the other communication device in communication with RAT transceiver 306. The feedback message notifies the other communication device regarding a period of unavailability of the RAT transceiver 306. For example, the feedback message may indicate a time interval with an assumed starting time (e.g., the starting time of the time interval occurs a predetermined time delay after the end of the feedback message, after the beginning of the feedback message, etc.), in some embodiments. As another example, the feedback message may indicate a starting time and a length of the time interval, in an embodiment. As another example, the feedback message may indicate a starting time and an ending time of the time interval, in an embodiment. In accordance with embodiments of the present disclosure, this period of unavailability may match or substantially match (e.g., within 10%) the time interval t2 needed for transmission of LTE frames.

Once the other communication device is aware of this period of unavailability, message and timing control module 304 may cause RAT transceiver 306 to enter a sleep mode and/or power down to save power via one or more instructions. In accordance with embodiments of the present disclosure, message and timing control module 304 may cause RAT transceiver 306 to enter a sleep and/or power down mode a period of time after the feedback message is sent. By waiting for this period of time, message and timing control module 304 can help ensure that the RAT transceiver 306 does not miss a transmission from the other communication device.

In accordance with another embodiment of the present disclosure, the host communication device or AP sends a confirmation message back to communication device 202 via RAT transceiver 306 indicting that the suggested time interval has been adopted, or else a new time interval is requested. Again, communication device 202 and the host communication device or AP may have different priority schedules, operating intervals, timing information, and/or processing tasks to consider. As a result, several messaging iterations between devices may occur until an unavailable time interval is successfully negotiated. As shown in FIG. 8B, once an unavailable time interval is negotiated, Wi-Fi receptions no longer take place during LTE transmissions. In this way, interference mitigation management system 300 mitigates interference with Wi-Fi reception by ensuring RAT transceiver 306 is unavailable for Wi-Fi data reception during LTE data transmissions.

In accordance with various embodiments of the present disclosure, the interval of unavailability is initiated at either the other communication device receiving the feedback message or the communication device in which RAT transceiver 306 is implemented. In accordance with such embodiments, message and timing control module 304 sends the feedback message via RAT transceiver 306 but then receives an instruction that the other communication device will not transmit Wi-Fi data to the RAT transceiver 306 during the interval of no transmission or during a different interval. Further in accordance with various embodiments, an updated time interval sent by the other communication device is given priority over the initial time interval sent in the feedback message. As will be appreciated by those of skill in the art, initiating the request for the interval of unavailability from either device provides options to offload processing and decrease time otherwise needed for iterations of negotiation. This may be particularly advantageous in more complex networks when the interval of unavailability is more easily determined by a host device that has access to more information regarding critical network time intervals and events.

Figure 9:
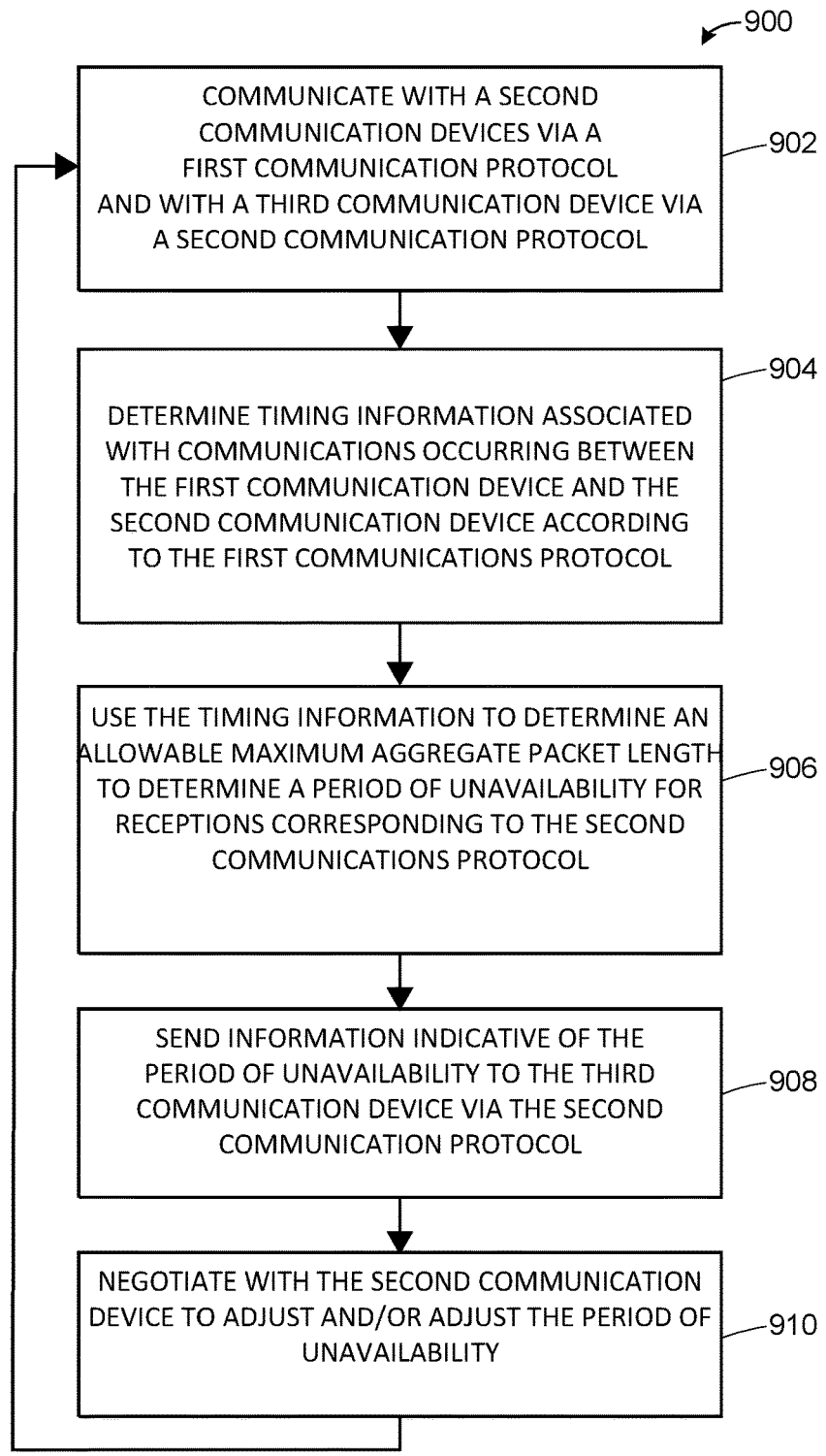
FIG. 9 illustrates a communications schedule adjustment method 900 in accordance with an embodiment of the present disclosure.

FIG. 9 illustrates a communications schedule adjustment method 900 in accordance with an embodiment of the present disclosure. In an exemplary embodiment of the present disclosure, method 900 is performed in a suitable communication device, such as one or more of communication device 25-1 and/or AP 14 (FIG. 1), communication device 202, AP 214, and/or AP 216 (FIG. 2), communication device 300 (FIG. 3), etc.

At block 902, a first communication device communicates with a second communication device via a first protocol, and communicates with a third communication device via a second protocol. In accordance with an embodiment of the present disclosure, these communications may occur concurrently or substantially concurrently.

At block 904, the first communication device determines timing information associated with communications with the second communication device via the first communications protocol. This timing information could include, for example, frame timing associated with LTE transmit or receive communications. To provide another example, the timing information could include a time period of unavailability calculated by message and timing control module 304.

At block 906, the first communication device uses the timing information determined at block 904 to determine a period of unavailability for receptions corresponding to the second communication protocol.

At block 908, the first communication device sends information indicative of the period of unavailability to the third communication device via the second communication protocol.

At block 910, the first communication device negotiates with the third communication device to adjust, and/or adjusts the period of unavailability such that data is not transmitted from the third communication device to the first communication device during transmissions by the first communication device to the second communication device via the first communication protocol.

In some embodiments, block 910 is omitted.

Method 900 may be repeated, in some embodiments. On subsequent iterations of method 900, blocks 908 and/or 910 may be skipped if the first communication device determines that adjustments to the period of unavailability is not needed.

The Figures presented herein are for illustrative purposes. Communications and/or couplings between various elements illustrated throughout the Figures may be performed using any type of coupling or means of communications to accomplish the corresponding operations as described herein. For example, even though single lines are used to illustrate communications between some elements, this communication may be implemented with any number of wires and/or buses. Furthermore, such communications may be implemented with any appropriate communication protocol, such as serial or parallel communications, regardless of the illustrated couplings.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable storage medium such as on a magnetic disk, an optical disk, in a RAM or ROM or flash memory, tape drive, etc. Likewise, the software or firmware instructions may be delivered to a user or a system via any known or desired delivery method. The software or firmware instructions may include machine readable instructions that, when executed by the processor, cause the processor to perform various acts.

When implemented in hardware, the hardware may comprise one or more of discrete components, an integrated circuit, an ASIC, a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

What is claimed:

1. A method, comprising:
    receiving, at a first communication device, a first communication frame that was transmitted by a second communication device according to a first communication protocol;
    transmitting, by the first communication device, a first acknowledgment packet (ACK) to a third communication device according to a second communication protocol that is different than the first communication protocol;
    determining, at the first communication device, that the first ACK was transmitted during a first portion of the first communication frame;
    negotiating, by the first communication device, a timing parameter with the third communication device, wherein the timing parameter corresponds to when the first communication device transmits ACKs, and wherein a value of the timing parameter is negotiated so that the first communication device will not transmit a second ACK during reception, by the first communication device, of a first portion of a second communication frame transmitted by the second communication device according to the first communication protocol;
    wherein negotiating the timing parameter includes exchanging, by the first communication device, the value of the timing parameter with the third communication device; and
    transmitting, by the first communication device, the second ACK according to the timing-parameter so that the second ACK is not transmitted during the first portion of the second communication frame.

2. The method of claim 1, wherein i) transmissions between the first communication device and the second communication device according to the first communication protocol, and ii) transmissions between the first communication device and the third communication device according to the second communication protocol occur substantially concurrently.

3. The method of claim 1, wherein:
    the first communication protocol is a 3rd Generation Partnership Project (3GPP) long-term evolution (LTE) protocol, and the second communication protocol is a Wi-Fi protocol.

4. The method of claim 3, wherein:
    determining that the first ACK was transmitted during the first portion of the first communication frame comprises determining that the first ACK was transmitted during a master information block (MIB), of the first communication frame, according to the 3GPP LTE protocol;
    determining the timing parameter comprises determining the timing parameter so that the first communication device will not transmit the second ACK during reception, by the first communication device, of an MIB of the second communication frame.

5. The method of claim 1, wherein determining the timing parameter comprises:
    determining the timing parameter so that the first communication device transmits the second ACK during reception, by the first communication device, of a second portion of the second communication frame, the second portion of the second communication frame transmitted by the second communication device after transmitting the first portion of the second communication frame.

6. The method of claim 1, wherein negotiating the timing parameter is in response to determining, at the first communication device, that the first ACK was transmitted during the first portion of the first communication frame.

7. A first communication device, comprising:
    a first radio access technology (RAT) transceiver configured to communicate with a second communication device according to a first communication protocol;
    a second RAT transceiver configured to communicate with a third communication device according to a second communication protocol that is different than the first communication protocol; and
    a message and timing control module implemented on an integrated circuit device, wherein the message and timing control module is configured to:
        determine that a first acknowledgment packet (ACK) was transmitted by the second RAT transceiver during reception, by the first RAT transceiver, of a first portion of a first communication frame transmitted by the second communication device,
        negotiate a timing parameter with the third communication device, wherein the timing parameter corresponds to when the first communication device transmits ACKs, and wherein a value of the timing parameter is negotiated so that the first communication device will not transmit a second ACK during reception, by the first communication device, of a first portion of a second communication frame transmitted by the second communication device according to the first communication protocol, wherein negotiating the timing parameter includes exchanging the value of the timing parameter with the third communication device, and
        cause the second RAT transceiver to utilize the timing parameter such that the second RAT transceiver transmits the second ACK so that the second ACK is not transmitted during reception, by the first RAT transceiver, of the first portion of the second communication frame transmitted by the second communication device.

8. The first communication device of claim 7, wherein i) transmissions between the first communication device and the second communication device according to the first communication protocol, and ii) transmissions between the first communication device and the third communication device according to the second communication protocol occur substantially concurrently.

9. The first communication device of claim 7, wherein:
the first RAT transceiver is configured to communicate according to a 3rd Generation Partnership Project (3GPP) long-term evolution (LTE) protocol; and the second RAT transceiver is configured to communicate according to a Wi-Fi protocol.

10. The first communication device of claim 9, wherein the message and timing control module is configured to:
determine that the first ACK was transmitted during a master information block (MIB), of the first communication frame, according to the 3GPP LTE protocol; and
determine the timing parameter so that the second RAT transceiver will not transmit the second ACK during reception, by the first RAT transceiver, of an MIB of the second communication frame.

11. The first communication device of claim 10, wherein the message and timing control module is configured to:
determine the timing parameter so that the second RAT transceiver transmits the second ACK during reception, by the first RAT transceiver, of a second portion of the second communication frame, the second portion of the second communication frame transmitted by the second communication device after transmitting the first portion of the second communication frame.

12. The first communication device of claim 7, wherein the message and timing control module is configured to negotiate the timing parameter with the third communication device in response to determining that the first ACK was transmitted during the first portion of the first communication frame.

13. The first communication device of claim 7, wherein:
the integrated circuit comprises a processor; and the processor is coupled to a memory storing machine readable instructions that, when executed by the processor, cause the processor to implement the message and timing control module.

14. A tangible, non-transitory computer readable medium storing machine readable instructions that, when executed by a processor associated with a first communication device, cause the processor to:
determine timing information associated with transmissions, according to a first communication protocol, between i) a first radio access technology (RAT) transceiver of the first communication device, and ii) a second communication device;
determine, using the timing information, that a first acknowledgment packet (ACK) was transmitted, according to a second communication protocol, by a second RAT transceiver of the first communication device during a first portion of a first communication frame transmitted by the second communication device, wherein the second communication protocol is different than the first communication protocol;
negotiate a timing parameter with the third communication device, wherein the timing parameter corresponds to when the first communication device transmits ACKs, and wherein a value of the timing parameter is negotiated so that the first communication device will not transmit a second ACK during reception, by the first communication device, of a first portion of a second communication frame transmitted by the second communication device according to the first communication protocol, wherein negotiating the timing parameter includes exchanging the value of the timing parameter with the third communication device; and
cause the second RAT transceiver to utilize the timing parameter such that the second RAT transceiver transmits the second ACK so that the second ACK is not transmitted during the first portion of the second communication frame transmitted by the second communication device.

15. The tangible, non-transitory computer readable medium of claim 14, wherein i) transmissions between the first communication device and the second communication device according to the first communication protocol, and ii) transmissions between the first communication device and the third communication device according to the second communication protocol occur substantially concurrently.

16. The tangible, non-transitory computer readable medium of claim 14, wherein:
the first RAT transceiver is configured to communicate according to a 3rd Generation Partnership Project (3GPP) long-term evolution (LTE) protocol; and the second RAT transceiver is configured to communicate according to a Wi-Fi protocol.

17. The tangible, non-transitory computer readable medium of claim 16, further storing machine readable instructions that, when executed by the processor, cause the processor to:
determine that the first ACK was transmitted during a master information block (MIB), of the first communication frame, according to the 3GPP LTE protocol; and
determine the timing parameter so that the second RAT transceiver will not transmit the second ACK during reception, by the first RAT transceiver, of an MIB of the second communication frame.

18. The tangible, non-transitory computer readable medium of claim 17, further storing machine readable instructions that, when executed by the processor, cause the processor to:
negotiate the timing parameter with the third communication device in response to determining that the first ACK was transmitted during the first portion of the first communication frame so that the second RAT transceiver transmits the second ACK during reception, by the first RAT transceiver, of a second portion of the second communication frame, the second portion of the second communication frame transmitted by the second communication device after transmitting the first portion of the second communication frame.

* * * * *